USO12327680B2

(12) United States Patent
Mihaila et al.

(10) Patent No.: US 12,327,680 B2
(45) Date of Patent: Jun. 10, 2025

(54) MAGNET STRUCTURE HAVING A PLURALITY OF INDIVIDUAL MAGNETS HAVING A REINFORCED CONNECTION

(71) Applicant: Whylot SAS, Cambes (FR)

(72) Inventors: Vasile Mihaila, Figeac (FR); Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 102 days.

(21) Appl. No.: 18/276,118

(22) PCT Filed: Feb. 2, 2022

(86) PCT No.: PCT/IB2022/050882
§ 371 (c)(1),
(2) Date: Aug. 7, 2023

(87) PCT Pub. No.: WO2022/167941
PCT Pub. Date: Aug. 11, 2022

(65) Prior Publication Data
US 2024/0128002 A1    Apr. 18, 2024

(30) Foreign Application Priority Data
Feb. 5, 2021 (FR) ........................... 2101152

(51) Int. Cl.
H01F 7/02        (2006.01)
H01F 41/02       (2006.01)
H02K 1/02        (2006.01)

(52) U.S. Cl.
CPC ......... *H01F 7/021* (2013.01); *H01F 41/0253* (2013.01); *H02K 1/02* (2013.01)

(58) Field of Classification Search
CPC ....... H01F 7/021; H01F 41/0253; H02K 1/02; H02K 1/2795; H02K 15/03; H02K 1/27; H02K 21/24
See application file for complete search history.

(56) References Cited

U.S. PATENT DOCUMENTS 6,359,359 B1    3/2002 Miura et al.
2020/0169129 A1   5/2020 Fatemi et al.

FOREIGN PATENT DOCUMENTS

CN    105896773 A  *  8/2016
CN    112039238       12/2020
(Continued)

OTHER PUBLICATIONS

Written Opinion and International Search Report dated Apr. 14, 2022 from IA No. PCT/IB2022/050882.

*Primary Examiner* — Mohamad A Musleh
(74) *Attorney, Agent, or Firm* — Crockett & Crockett, PC; K. David Crockett, Esq.

(57) ABSTRACT

A Magnet structure with a plurality of individual magnets having a reinforced connection. This invention relates to a magnet structure (2) in three dimensions having cutouts (4 to 7) extending along a height of the magnet structure (2) and forming groups of cutouts. Each cutout is interrupted, forming two parts (4, 6; 5, 7) in the height direction, leaving a material-filled gap between them. The gaps of one group form a heel portion (8a, 8b), the cutouts (4 to 7) delimiting between them individual magnets (3) connected to one another by the heel. At least one gap between one cutout of one group is at a height different from at least one gap between a cutout of another group so that portions of them extend at least partly over different height levels.

16 Claims, 6 Drawing Sheets

(56) References Cited

FOREIGN PATENT DOCUMENTS

CN 112039238 A * 12/2020 ............... H02K 1/27
JP 2006238565 9/2006

* cited by examiner

MAGNET STRUCTURE HAVING A PLURALITY OF INDIVIDUAL MAGNETS HAVING A REINFORCED CONNECTION

FIELD OF THE INVENTIONS

This invention relates to a magnet structure with a plurality of individual magnets having a reinforced connection between the magnets as well as an electromagnetic motor or generator equipped with a magnet structure according to the invention.

BACKGROUND

This invention has an advantageous but not restrictive application in a rotary electromagnetic actuator that delivers high power at a high speed of rotation of the rotor, which is achieved by the use of one or more magnet structures according to this invention.

Also advantageously but not restrictively, the actuator can be a rotary actuator that can comprise at least one rotor framed by two stators, wherein these elements can be superimposed one on top of the other and be separated by at least one air gap on a single shaft.

For optimum performance in high-speed applications it is necessary to have not only a compact system made possible by the reduction of the size and weight of the electromagnetic actuator but also very good mechanical strength of the rotating part or the part in translation, i.e. the rotor or the element in linear translation, to improve the reliability of the system.

In a high-power motor, the rotor rotates at high speeds of rotation. The principal disadvantage of a motor with a high speed of rotation is the high probability that the magnet or the magnets will become detached from the rotor, as well as that the rotor will break, at least partly. The rotor of a motor of this type must therefore be capable of withstanding high speeds of rotation.

It is therefore necessary to reduce losses to achieve optimum performance.

On an axial flux motor, these losses can occur in the rotor or rotors of the electric motor or in the magnets.

With regard to the rotors, eddy current losses in the magnets have been significantly reduced, in particular by proposing ironless rotors or by proposing magnetic poles constituted by a plurality of small individual magnets.

For example, EP3602743 (A1) describes a three-dimensional magnet pole constituted by a plurality of individual magnets. Each individual magnet is in the form of an elongated contact plate having a length extending along the thickness of the magnet structure.

The individual magnets are positioned in the magnet structure at a distance from one another so that they are electrically isolated from one another.

A configuration of this type is highly satisfactory with regard to the reduction of eddy current losses. However, this configuration requires a complicated fabrication process on account of the need to position the individual magnets in relation to one another. Moreover, it has been determined that the mechanical strength of a magnet structure of this type must be increased for specific applications.

To reduce these disadvantages, it has also been proposed to locally join the individual magnets by the formation of a flat heel that is common to all the individual magnets and is located at the midpoint of the height of the magnet structure. This solution has been shown to be unsatisfactory on the level of losses in the individual magnets, which offsets all the benefits achieved by the use of individual magnets compared to a magnet pole composed only of a single large magnet. Therefore there is a strong prejudice against the use of such a technique of connecting individual magnets to one another into a magnet structure by means of a common heel.

CN112039238(A) describes a magnet structure in three dimensions, one of which is height. The magnet structure has cutouts extending along the height of the magnet structure and forming groups of cutouts, the cutouts of each group being interrupted to each form two parts in the height direction of the cutout, and leaving a material-filled gap between the two parts of a given cutout.

The material-filled gaps of a group of cutouts form a portion of a component that can be likened to a one-piece heel common to all the groups of cutouts, the cutouts delimiting among themselves individual magnets that are connected to one another by the heel.

In this document CN112039238(A), the cutouts are in the form of shallow grooves. The material-filled gap between the grooves, which are opposite each other two-by-two, each on one of the two opposite sides of the magnet structure forming the heel-like component, extends to a very majority degree over the height of the magnet structure.

However, this has the disadvantage that the reduction of eddy currents, which was the object of document CN112039238(A), is less effective on account of the fact that the individual magnets are not separated by a cutout.

The problem addressed by the present invention is to design a magnet structure for an electromagnetic actuator that can withstand high speeds of operation while supplying a powerful magnetic field, all while being simple to manufacture and having high mechanical strength.

For this purpose, the present invention relates to a magnet structure in three dimensions, one of which is height, the magnet structure having cutouts extending along the height of the magnet structure and forming groups of cutouts, the cutouts of each group being interrupted to each form two parts in the height direction of the cutout and leaving a material-filled gap between the two parts of a given cutout, the material-filled gaps of one group of cutouts forming a portion of a one-piece heel common to all the groups of cutouts, the cutouts delimiting between themselves individual magnets held connected to one another by the heel, characterized in that the material-filled gaps have a height of between 2 and 20% of a total height of the cutouts, at least one material-filled gap between a cutout of one group being located at a different height than at least one material-filled gap between a cutout of another group, so that the heel portions of the different groups of cutouts extend at least partly over different height levels in the magnet structure.

It has been proposed that one or more large magnets can be replaced by a plurality of small magnets. In this case, a magnetic flux is created by a multitude of small magnets, the number of which can be at least 20 and can even exceed 100 per magnetic pole.

The object of this invention is to preserve these advantages while making each magnet structure even stronger. The presence of a heel connecting the individual magnets to one another increases the strength.

Based on an analysis of the prior art relative to a magnet structure comprising a heel, there has been a prejudice against the use of a connection of the individual magnets among one another by the presence of a common heel.

SUMMARY

It has been found that the presence of a flat heel common to the individual magnets in the magnet structure offsets or significantly reduces all the advantages achieved by the use of individual magnets, in particular as a result of the appearance of eddy current losses.

Quite surprisingly, the applicant has observed that a heel consisting of a single piece of magnetized material, but also composed of successive heel portions corresponding to groups of cutouts, these successive heel portions extending along different heights in the magnet structure and also conferring on the assembly a shape that can be zig-zag and not extending in a single plane, has made it possible to preserve the advantages achieved by a use of individual magnets in the magnet structure while reinforcing the strength and durability of the magnet structure.

According to this invention, in contrast to a flat heel connecting the individual magnets as in the prior art, the heel portions are in one piece but extend to two different levels in the magnet structure depending on their group of cutouts. Therefore there are differences in the height level or steps between two adjacent edges of successive heel portions associated with two different groups of cutouts.

It has been found that these differences in height level or jumps in height make it possible to reduce eddy current losses compared to a magnet structure comprising a flat heel, these losses being essentially equivalent to those of individual magnets that do not have a heel.

The height of the material-filled gaps that corresponds to the thickness of the heel must satisfy two contradictory requirements.

First, this height of the material-filled gaps must be sufficiently large to reinforce the solidity of the magnet structure and the connection of the individual magnets among themselves.

Second, and contradictory to the first requirement, this height of the material-filled gaps must be sufficiently low that it does not increase eddy current losses.

The applicant has found that a range of 2 to 20%, preferably from 2 to 10%, for the height of the material-filled gaps in relation to the total height of the cutouts satisfies both these requirements.

This invention therefore makes it possible to combine the advantages of a magnet structure with a heel, which is simple to fabricate and is associated with an improved retention of the individual magnets, with the advantages of a magnet structure with independent individual magnets, advantages that have been described above.

The heel formed in this manner is made of the same magnetic material as the individual magnets and is obtained by working a blank of the magnet structure made of magnetic material.

Advantageously, the cutouts run all the way through the magnet structure, extending from one side of the magnet structure to another side opposite it, a group of cutouts associated with one side intersecting with at least one group of cutouts associated with another side, or one group of cutouts being extended by at least one other group of cutouts around the individual magnets.

For example, for a rectangular or square cross section of the magnet structure, the groups of cutouts intersect to form a grid.

In another configuration, for example for a hexagonal cross section of the magnet structure with hexagonal individual magnets and more generally for a cross section having more than four sides, the cutouts of one group of cutouts along one of the sides are complemented by cutouts along two or more other sides.

The cutouts of a given group of cutouts advantageously extend parallel to one another.

Advantageously, the material-filled gaps have the same dimension measured in the direction of the height of the magnet structure for all the groups of cutouts.

Advantageously, the cutouts of a given group of cutouts have their material-filled gaps on at least two different height levels. This results in heel portions associated with a given group of cutouts having steps, which results in a common heel with even more steps than for the cutout groups each having cutouts with material-filled gaps at the same height.

Advantageously, in the vertically held position of the height of the magnet structure, the at least one material-filled gap between the cutout of one group has its highest end at a height equal to the height of a lowest end of the at least one material-filled gap between the cutout of another group.

This is a preferred but not restrictive embodiment of the present invention. This configuration is the one that has the lowest eddy current losses.

The heel portions of the groups of cutouts advantageously extend at least partly over a number of height levels less than or equal to the number of sides of an individual magnet.

For example, for a rectangular or square cross section of the magnet structure, there are two groups of cutouts, with the cutouts of the first group perpendicular to the cutouts of the second group.

In another configuration, for example for a hexagonal cross section of the magnet structure with hexagonal individual magnets and more generally for a cross section with more than four sides of the individual magnets, there can be more than three different groups of cutouts, this number being equal to not more than one-half the number of sides of the individual magnets.

Each individual magnet advantageously has an auxiliary cutout extending along the height of the magnet structure and separating the individual magnets into two equal portions, the auxiliary cutouts of the individual magnets also being interrupted, each forming two parts in the height direction of the magnet structure, and leaving a material-filled gap between the two parts of a given auxiliary cutout.

Individual magnets having a triangular cross section can also be obtained starting with individual magnets having a square or rectangular cross section.

The material-filled gaps are advantageously located in an area that surrounds the magnet structure at half its height by more or less 20%.

The fact of providing a heel at half the height of the individual magnets increases the solidity of the magnet structure by equalizing its hold in its high and low portions.

The cutouts are advantageously filled with a layer of non-conductive composite coating the individual magnets.

This further strengthens the connection of the individual magnets among themselves and the integrity of the magnet structure.

Advantageously, a ratio of a cross section of an individual magnet to a cross section of the magnet structure is less than 20%, a perimeter of each individual magnet being less than the height of the individual magnet.

This increases the advantages conferred by the individual magnets. The smaller the cross section of the individual magnets with more numerous individual magnets in the magnet structure, the greater the advantages relative to the use of the above mentioned individual magnets.

The invention further relates to a linear or rotary electromagnetic motor or generator, characterized in that it comprises a single magnet structure of the type described above or a plurality of such magnet structures, the magnet structure or structures forming magnet poles in a rectangular assembly or forming part of a rotor rotating around its center, the magnet structure or structures being arranged concentrically to the rotor.

A motor of this type can advantageously be an axial flux motor.

For example, for an axial flux motor, one or more rotors of the prior art can comprise from 1 to 10 magnets forming magnetic poles, while the present invention provides many more small size magnets in each magnet structure forming a magnetic pole.

Because a rotor can carry 5 to 10 or even more magnets, a magnetic pole must not be confused with individual magnets, of which there are a significantly greater number, because a rotor can carry several hundreds of magnets, for example.

This makes it possible to obtain a rotor which, among other advantages, can rotate at a high speed and does not contain iron, which limits the rotor losses.

Moreover, on account of a heel extending in a non-flat manner into the magnet structure or into each magnet structure, the strength of the magnet structure or each magnet structure is reinforced while the advantages described above achieved by the use of small individual magnets are preserved.

Each magnet structure is advantageously individually coated in a layer of composite.

This measurement further reinforces the mechanical strength of the magnet structure considered as a whole.

Finally, the invention also relates to a method for the fabrication of a magnet structure of the type described above, characterized by the following steps:
- insertion into a blank magnet structure of a plurality of groups of cutouts, the cutouts of each group being interrupted, each forming two parts in the height direction of the cutout, and leaving a material-filled gap between the two parts of a given cutout,
- at least one material-filled gap between a cutout of one group located at a different height from at least one material-filled gap and a cutout of another group.

The result is a simplified fabrication of the magnet structure. During a fabrication process of a magnet structure having a plurality of individual magnets according to the prior art, the individual magnets are difficult to hold in position when they are not connected to one another, for example when they are not joined to one another by a layer of composite. The presence of a mesh to hold the individual magnets may therefore be required, which complicates the fabrication process.

Likewise, during the execution of a fabrication process for a magnet structure according to the prior art, it may be necessary to cut the magnet structure blank, leaving a heel to hold the individual magnets, inject a composite around the individual magnets, cut the heel and then inject composite a second time, in contrast to the present invention, in which the heel portions remain part of the magnet structure, forming the heel over several heights connecting all the individual magnets to one another.

The following description refers to all the figures considered in combination. When reference is made to one or more specific figures, these figures are to be considered in combination with the other figures for the identification of the designated numeric references.

In the figures, when present, only one individual magnet 3 and only one magnet structure or pole is referenced as 2, although the information presented above for the individual magnet 3 and the magnetic pole 2 respectively is valid for all the individual magnets and all the magnetic structures.

DETAILED DESCRIPTION OF THE INVENTIONS

With reference principally to FIGS. 1 to 11, the present invention relates to a magnet structure 2 in three dimensions, one of which is height.

This magnet structure 2 can have a triangular cross section and therefore three sides, a square or rectangular cross section and therefore four sides, or a polygonal cross section with a number of sides equal to or greater than 4. When present, the opposite sides of the magnet structure 2 are not necessarily parallel.

It is also possible for the magnet structure 2 to have a circular cross section and a cylindrical shape.

The same is true for the individual magnets that make up this magnet structure 2.

In accordance with one essential characteristic of the present invention, during its fabrication, the magnet structure 2 has cutouts 4 to 7, 20, 21 extending along the height of the magnet structure 2 and forming groups of cutouts, as shown most particularly in FIGS. 1, 4, 7 and 9.

Cutouts 4 to 7, 20, 21 of each group are interrupted, each forming two parts 4, 6; 5, 7; 20, 21 in the height direction of the cutout. A material-filled gap then remains between the two parts 4, 6; 5, 7; 20, 21 of a given cutout, the material also being magnetic because it originates from the magnet structure 2.

The material-filled gaps of a group of cutouts 4 to 7, 20, 21 form a portion 8a to 8d of a heel. This heel will be one piece and common to all the groups of cutouts, while retaining specificities for each group of cutouts 4 to 7, 20, 21.

Figure 7:
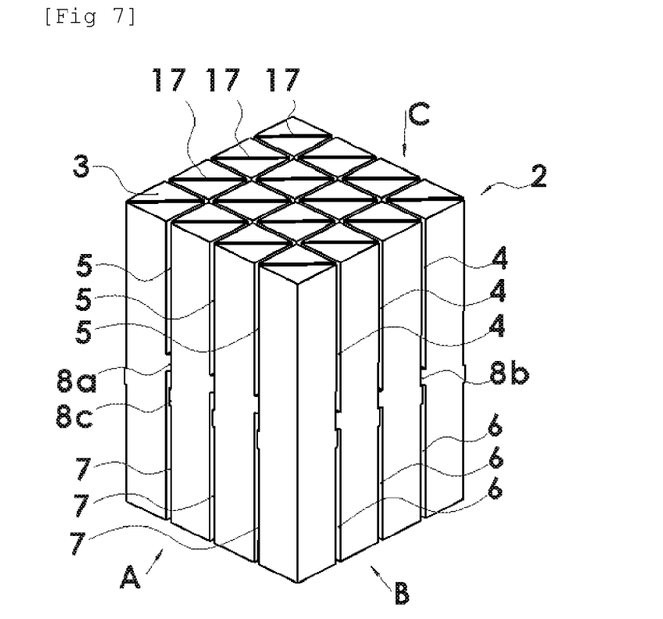
FIG. 7 is a perspective view of a magnet structure according to a third embodiment of the present invention.
Figure 8:
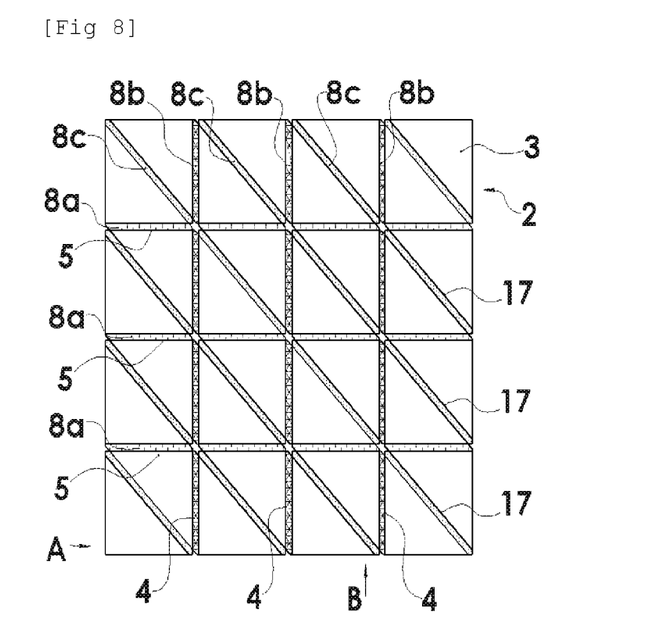
FIG. 8 is a sectional view along arrow C of the magnet structure shown in FIG. 7.
Figure 9:
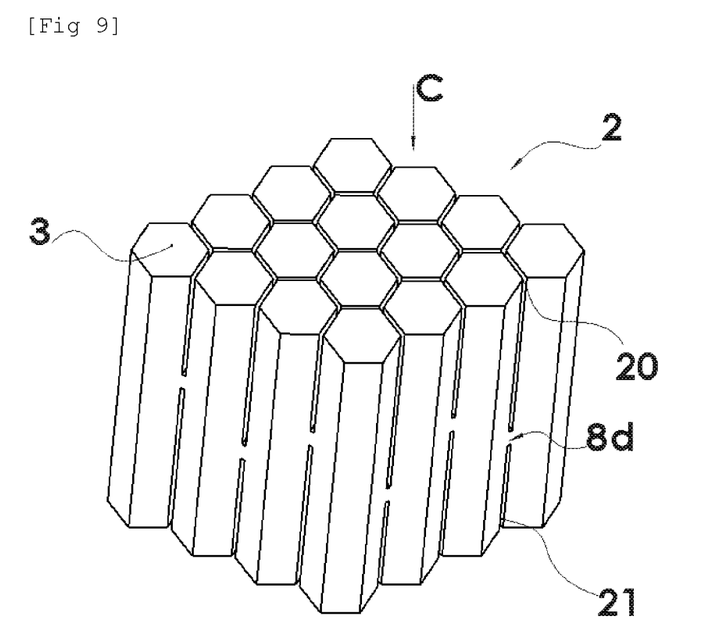
FIG. 9 is a perspective view of a magnet structure according to fourth and fifth embodiments of the present invention.
Figure 10:
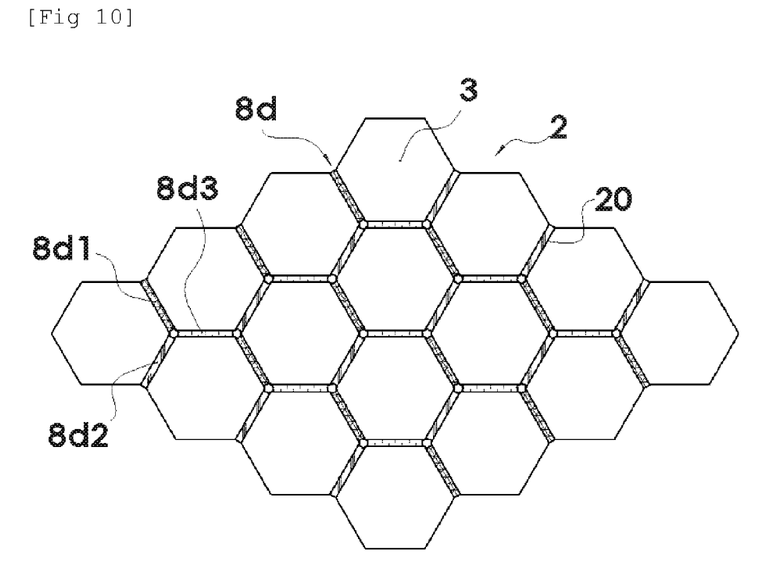
FIG. 10 is a sectional view along arrow C of the magnet structure shown in FIG. 9 for the fourth embodiment of the present invention.
Figure 11:
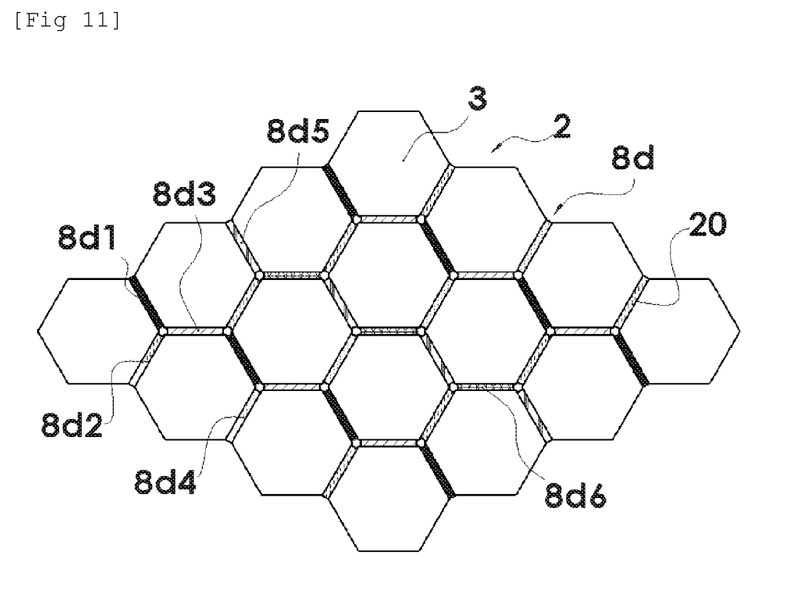
FIG. 11 is a sectional view along arrow C of the magnet structure shown in FIG. 9 for the fifth embodiment of the present invention.

The cutouts 4 to 7, 20, 21 of different groups can intersect, as in the case of a magnet structure 2 with a square or rectangular cross section shown in particular in FIGS. 1 to 8, or extend into each other as shown for a magnet structure 2 with individual magnets 3 having a hexagonal cross section shown in FIGS. 9 11.

All the cutouts 4 to 7, 20, 21 taken together delimit between them individual magnets 3 held together between them by the heel, making up a plurality of heel portions 8a to 8d associated with different groups.

So that the common heel is not flat, at least one material-filled gap between a cutout of one group is located at a different height from at least one material filled gap between a cutout of another group of cutouts.

Therefore the heel portions 8a to 8d of the different groups of cutouts extend at least partly over different height levels in the magnet structure 2 and result in a common heel with steps.

Without being restrictive and being purely illustrative, the individual magnets 3 are in the form of contact plates with a 1 mm heel that can be positioned at half the height of the individual magnet.

The prior art proposes three configurations: one configuration with a solid magnet structure without individual magnet cutouts, a configuration with a magnet structure with individual magnets that do not comprise a heel, i.e. of magnetized material of the magnet structure connecting them, and a configuration with a magnet structure comprising a flat heel of magnetized material connecting the individual magnets.

The present invention proposes the principal configuration with a magnet structure 2 with individual magnets 3 connected by a stepped heel extending to various heights in the magnet structure 2.

Experiments conducted by the applicant have shown that the configuration most favorable to the reduction of eddy current losses is a magnet structure with individual magnets not comprising a heel, according to the second configuration of the prior art.

The eddy current losses with a magnet structure without individual magnets according to the first configuration are at least 60 times greater than for the second configuration, and the eddy current losses with a magnet structure with individual magnets connected by a flat heel according to the third configuration are at least 9 times greater than for the second configuration.

On the other hand, the configuration according to the present invention with a magnet structure 2 with individual magnets connected by a stepped heel extending to various heights in the magnet structure 2 has losses that are barely greater than for the magnet structure 2 with individual magnets not connected by magnetized material and not having a heel, these losses being 1.16 times greater than for the second configuration of the prior art.

This increase in eddy current losses, however, is significantly offset by the ease of fabrication of a magnet structure 2 according to the invention. During the fabrication of a magnet structure with individual magnets not connected by a heel, before an injection of composite between the individual magnets to hold them together, these individual magnets have a tendency to separate from one another.

Moreover, even with the injection of composite between the individual magnets, a magnet structure of this type according to the second configuration of the prior art will have a lower mechanical strength than the magnet structure 2 proposed by the present invention, because the stepped heel, which is made of magnetized material in one piece with the individual magnets 3 and connects all the individual magnets 3, significantly reinforces the mechanical strength of the magnet structure 2.

The cutouts 4 to 7 can run all the way through the magnet structure 2, i.e. in the two dimensions of the magnet structure 2 other than its height, by extending from one side of the magnet structure 2 to another side opposite it, a group of cutouts 4, 6 associated with one side intersecting with at least one group of cutouts 5, 7 associated with another side.

Figure 5:
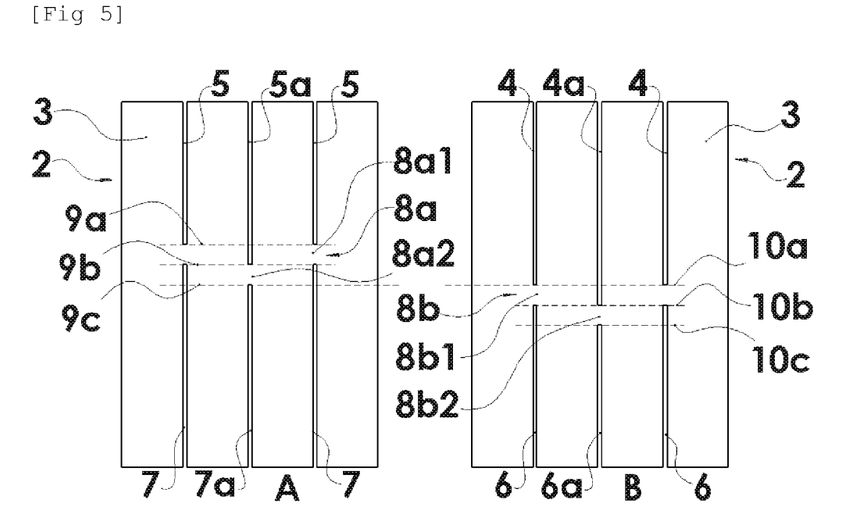
FIG. 5 is a sectional view along arrows A and B of the magnet structure shown in FIG. 4.
Figure 6:
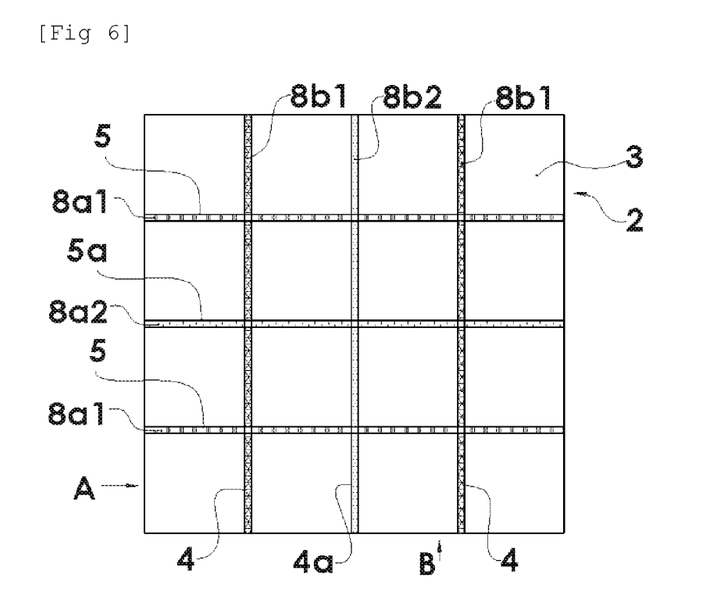
FIG. 6 is a sectional view along arrow C of the magnet structure shown in FIG. 4.

This is the case for the three embodiments illustrated in FIGS. 1 to 8, whereby FIGS. 1 to 6 illustrate a rectangular or square magnet structure 2 with rectangular or square individual magnets 3, and FIGS. 7 to 8 show an approximately square magnet structure 2 with individual magnets 3 separated into two halves with a triangular cross section.

The magnet structure 2 illustrated in FIGS. 1 to 8, however, can have a shape other than that shown respectively in these figures. For example, for FIGS. 1 to 6, the magnet structure 2 can have a square or circular cross section with square or cylindrical individual magnets, and for FIGS. 7 and 8, the magnet structure 2 can have a rectangular or circular cross section with rectangular or cylindrical individual magnets 3.

For a magnet structure 2 having a square cross section, the individual magnets 3, which then have a square cross section, can also not be divided into two magnets with a triangular cross section and therefore retain their square cross section, in contrast to what is illustrated in FIG. 7.

As illustrated in FIGS. 1 to 8, the cutouts 4, 6; 5, 7 of a given group of cutouts can extend parallel to one another. In this case, there is another group of cutouts comprising cutouts 4, 6 which extend perpendicular to the cutouts 5, 7 of the first group.

Figure 1:
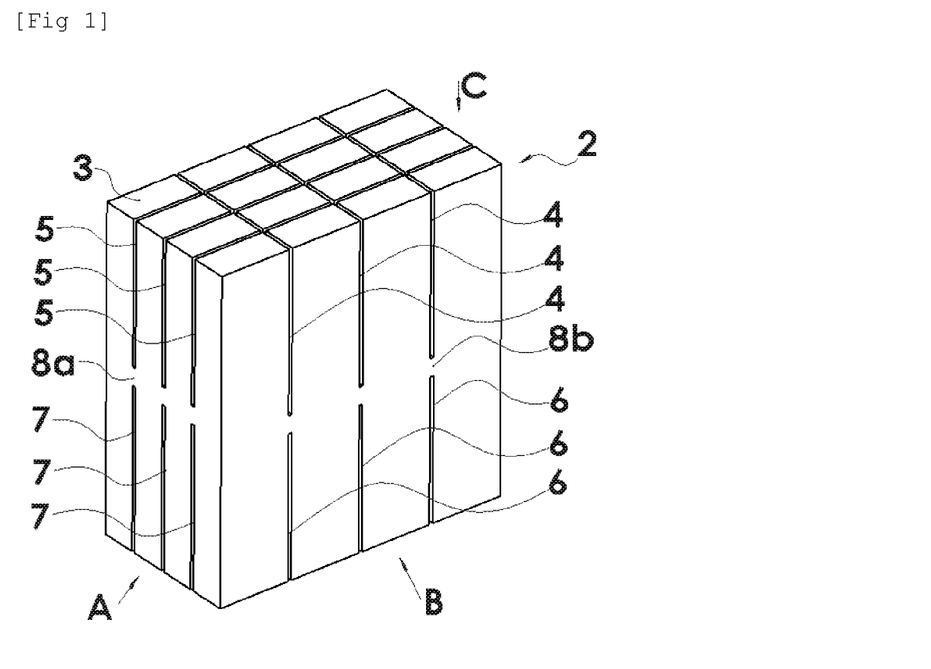
FIG. 1 is a perspective view of a magnet structure according to a first embodiment of the present invention.
Figure 2:
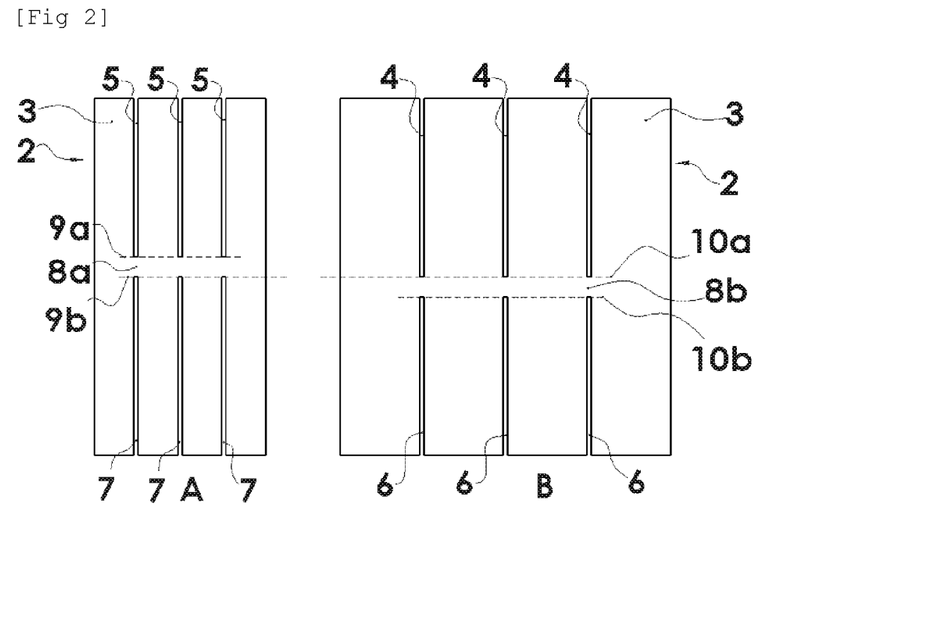
FIG. 2 is a sectional view along arrows A and B of the magnet structure shown in FIG. 1.
Figure 3:
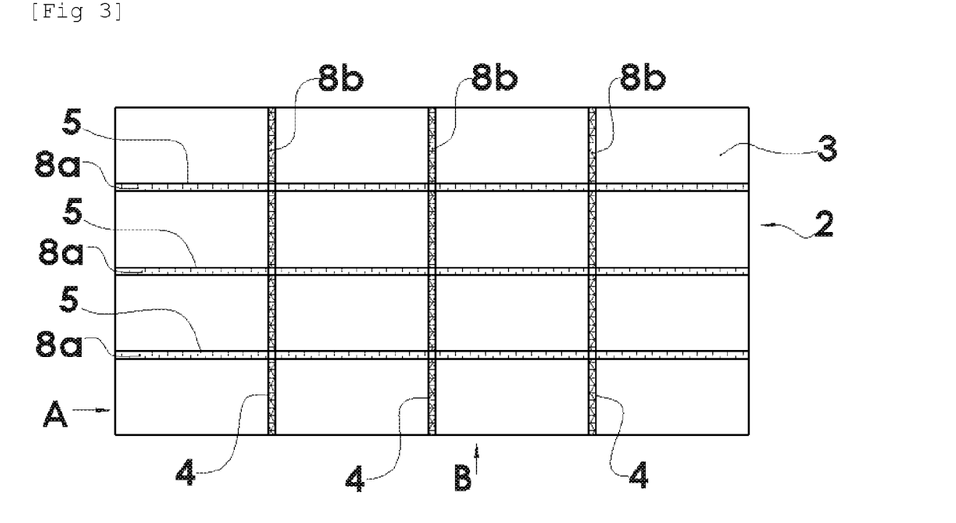
FIG. 3 is a sectional view along arrow C of the magnet structure shown in FIG. 1.

FIGS. 1 to 3 show a rectangular magnet structure 2 with rectangular individual magnets 3.

The height of the cutouts 4, 6 extending into the width of the magnet structure 2, called lateral cutouts, have two parts identified respectively as 4 and 6 and are all interrupted at the same height level. Between the parts 4, 6 of these lateral cutouts a lateral heel part 8b is formed by the material-filled gap remaining between the two parts 4, 6 of these lateral cutouts.

In this first optional embodiment of the present invention, the height cutouts extending into the width of the magnet structure 2, called longitudinal cutouts 5, 7 have two parts identified respectively as 5 and 7 and are all interrupted at the same height level, but at a height different from the lateral cutouts 4, 6.

Between the parts 5, 7 of these longitudinal cutouts, a longitudinal heel part 8a is formed by the material-filled gap remaining between the two parts 5, 7 of these longitudinal cutouts.

In FIG. 2, which shows views along arrows A and B in FIG. 1, a line 9a is shown, indicating the lower end of the upper portion 5 of the longitudinal cutouts and a line 9b indicating the upper and of the lower portion 7 of the longitudinal cutouts. The lines 9a and 9b between them delimit a longitudinal heel portion 8a.

The figure also shows a line 10a indicating the lower end of the upper portion 4 of the lateral cutouts and a line 10b indicating the upper and of the lower portion 6 of the longitudinal cutouts. The lines 10a and 10b between them delimit a longitudinal heel portion 8b.

It follows that, in the embodiment illustrated in FIGS. 1 to 3, all the lower ends 9a, 10a of the parts 5, 4 of the longitudinal or respectively lateral cutout are aligned with one another for each group, and all the upper ends 9b, 10b of the parts 7, 6 of the longitudinal or respectively lateral cutout are aligned between them for a given group of cutouts.

As shown most clearly in FIG. 3, which is a view along arrow C in FIG. 1, there are only two heel heights, each identified by specific hatchings, for the common heel composed of a lateral heel portion b 8 and a longitudinal heel portion 8a. The common heel is therefore stepped over two heights in the magnet structure 2.

In this first optional embodiment of the present invention, the material-filled gaps of a given group of cutouts can be located on the same height level.

Figure 4:
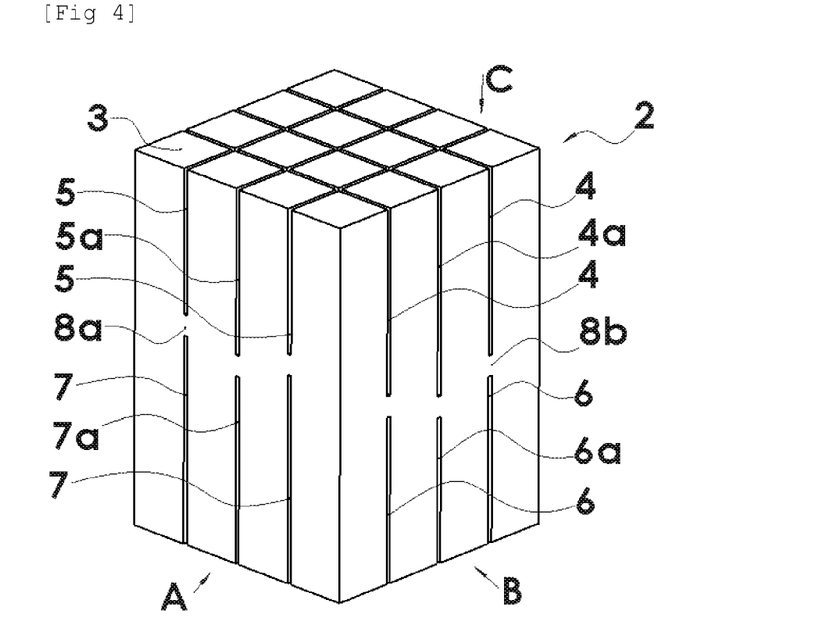
FIG. 4 is a perspective view of a magnet structure according to a second embodiment of the present invention.

FIGS. 4 to 6 show a second optional embodiment of a square or rectangular magnet structure 2 according to the present invention.

The magnet structure 2 is shown with a square cross section, but what has been stated above can be applicable to a rectangular magnet structure 2.

This second embodiment differs from the first embodiment in that all the lateral cutouts and respectively all the longitudinal cutouts are not interrupted at the same height level. In FIG. 1, the first and third lateral cutouts in two parts 4, 6 are interrupted at a different level than the second lateral cutout in two parts 4a, 6a.

Likewise, the first and third longitudinal cutouts in two parts 5, 7 are interrupted at a different level than the second longitudinal cut-out in two parts 5a, 7a.

It should be noted that there can be more than three longitudinal or lateral cutouts in the magnet structure 2.

FIG. 5 also shows a line 9a indicating the lower end of the upper portion 5 of the first and third longitudinal cutouts and a line 9b indicating the upper end of the lower portion 7 of the first and third longitudinal cutouts. The lines 9a and 9b between them delimit a longitudinal heel portion 8a1.

The figure also shows a line 9b indicating the lower end of the upper portion 5a of the second longitudinal cutout and a line 9c indicating the upper end of the lower portion 7a of the second longitudinal cutout. The lines 9a and 9b between them delimit a longitudinal heel portion 8a2.

It should be noted that the lower end of the upper portion 5a of the second longitudinal cutout is not necessarily at the height of the upper and of the lower portion 7 of the first and third longitudinal cutouts, which is a particular and non-restricting case.

In this case, there are two steps for a longitudinal heel part 8a formed by the longitudinal heel parts 8a1 and 8a2.

The same is true for the lateral heel part 8b formed by the lateral heel parts 8b1 and 8b2, respectively delimited by lines 10a and 10b for the first and third lateral cutouts with parts 4 and 6, and by the lines 10b and 10c for the second lateral cutout with the parts 4a and 6a.

In FIG. 5, which shows views along arrows A and B in FIG. 4, the lower end of the upper portion 4a of the second lateral cutout is aligned with the upper end of the lower portion 6 of the first and third lateral cutouts. This is not in any case obligatory but is preferred.

As shown most clearly in FIG. 6, which is a view along arrow C in FIG. 4, there can then be four heel heights, each identified by specific hatchings, for the common heel composed of two lateral heel parts 8a1 and 8a2 and two longitudinal heel parts 8b1 and 8b2, the latter if one of the lateral heels 8a1 and 8a2 is not at the same height as the longitudinal heels 8b1 and 8b2.

The common heel is therefore stepped over at least three heights in the magnet structure 2.

Therefore in this second optional embodiment of a magnet structure 2 according to the present invention, the material-filled gaps of
a given group of cutouts can be located on different height levels. In this case, it is possible to have an alternation of material-filled gaps at different levels, although this is not obligatory.

FIGS. 7 and 8 show a third optional embodiment of a magnet structure 2 according to the present invention.

In FIG. 7, the magnet structure 2 is square, as are the individual magnets, which once again is not obligatory. FIGS. 7 and 8 show lateral cutouts into parts 4, 6, all interrupted at the same height, while the longitudinal cutouts into parts 5, 7 are all interrupted at the same height, which is different from the height of the interruption of the lateral cutouts. This is not restrictive for this third optional embodiment.

In this third optional embodiment, each individual magnet 3 can be given an auxiliary cutout 17 extending along the height of the magnet structure 2 and separating the individual magnet 3 into two equal portions, advantageously with a triangular cross section, although this shape is not restrictive.

Like the lateral and longitudinal cutouts, the auxiliary cutouts 17 of the individual magnets 3 can also be interrupted, each forming two parts in the height direction of the magnet structure 2 and leaving a material-filled gap between the two parts of a given auxiliary cutout 17.

In the illustration in FIGS. 7 and 8, the auxiliary cutouts 17 join on one side a lateral cutout with the parts 4, 6, and on the other side a longitudinal cutout with the parts 5, 7.

In addition to the lateral and longitudinal heel parts 8b and 8a, the magnet structure 2 has an auxiliary heel part 8c with an auxiliary cutout 17, also in two parts.

As shown most clearly in FIG. 8, which is a view along arrow C in FIG. 7, there are then three heel heights, each identified by specific hatchings, for the common heel composed of a lateral heel part 8b, a longitudinal heel part 8a and an auxiliary heel part 8c.

The common heel is therefore stepped over at least three heights in the magnet structure 2 when the height of the auxiliary heel part 8c is not equal to a height either of a lateral heel part 8b or a longitudinal heel part 8a.

For all these embodiments, in the position in which the height of the magnet structure 2 is vertically maintained, as illustrated in FIGS. 2 and 5, it is possible but not obligatory for a material-filled gap between the cutout of one group, for example a group of lateral cutouts 4, 6 forming a lateral heel part 8b, to have its highest end at a height equal to the height of a lowest end of a material-filled gap between the cutout of another group, for example a group of longitudinal cutouts 5, 7 forming a longitudinal heel part 8a.

The second and third optional embodiments of the present invention can also be combined with one another.

FIGS. 9 to 11 illustrate fourth and fifth optional embodiments of a magnet structure 2 according to the present invention.

FIGS. 9 to 11 show a magnet structure 2 with facets that give it a contour of an approximately rectangular shape, although they can also be a different shape.

In FIGS. 9 to 11, the individual magnets 3 delimited by the cutouts 20, 21 have a hexagonal cross section, but everything that will be described below with reference to this hexagonal cross section can also be applied to any polygonal cross section having more than four sides.

The hexagonal cross section of the individual magnets 3 is delimited by six cutouts 20, 21 for an individual magnet which is not on the edge of the magnet structure 2.

In FIG. 9, the reference 8*d* indicates a portion of a heel common to all the individual magnets 3 and to the magnet structure 2, this common heel portion being visible on the periphery of the magnet structure 2.

Each cutout is composed of two parts 20 and 21, leaving between them a material-filled gap between the two parts 20, 21 of a given cutout.

The material-filled gaps of a group of cutouts 20, 21 form a portion of a common heel, as will be described in greater detail with reference to FIGS. 10 and 11. Moreover, the material-filled gaps are located in an area that surrounds the magnet structure 2 at half its height by more or less 20%.

FIGS. 10 and 11 illustrate two embodiments that differ in the number of heel parts located at two different heights, although these different heel parts are not visible in FIG. 9 because they are inside the magnet structure 2.

With reference first of all to FIG. 10, which is a view along arrow C in FIG. 9, according to the fourth optional embodiment, the figure shows three different height levels of the heel part, the three levels being illustrated by different hatchings. A common heel 8*d* is composed of three types of heel parts 8*d*1, 8*d*2, 8*d*3, representing steps of the common heel 8*d* over three height levels.

With reference first of all to FIG. 11, which is a view along arrow C in FIG. 9, according to the fifth optional embodiment, the figure shows six different height levels of the heel part, the six levels being indicated by different hatchings. A common heel 8*d* is composed of six types of heel parts 8*d*1, 8*d*2, 8*d*3, 8*d*4, 8*d*5, 8*d*6, representing steps of the common heel 8*d* over three height levels.

As shown in FIGS. 10 to 11 with hexagonal shaped individual magnets 3, a magnet structure 2 can have groups of cutouts with one group of cutouts 20, 21 extended by at least one other group of cutouts, advantageously two other groups of cutouts.

The cutouts 20, 21 of a given group of cutouts can advantageously be parallel to each other.

With reference to all the figures, for all the embodiments, the material-filled gaps can have the same dimension measured in the direction of the height of the magnet structure 2 for all the groups of cutouts.

Generally, in particular for individual magnets 3 with polygonal cross sections having more than four sides, the heel portions 8*d*1 to 8*d*6 of the groups of cutouts can extend at least partly over a number of height levels less than or equal to the number of sides of an individual magnet 3.

In terms of order of magnitude, and without being restrictive, the material-filled gaps, and therefore the thicknesses of the heel parts 8*a* to 8*d* can have a height between 2 and 20% of a total height of the cutouts 4 to 7, 20, 21.

During the fabrication of a magnet structure 2, the cutouts 4 to 7, 20, 21 can be filled with a layer of nonconductive composite coating the individual magnets 3, the layer of composite being advantageously fiber reinforced.

Since the individual magnets 3 have a relatively small cross section in relation to the magnet structure 2, in order to have the largest number of individual magnets for a magnet structure 2, a ratio of a cross section of an individual magnet to a cross section of the magnet structure 2 can be less than 20%, and preferably less than 10%.

Likewise, a perimeter of each individual magnet 3 can be less than the height of the individual magnet 3, in order to have an individual magnet 3 in the form of an elongated contact plate.

As mentioned above but not illustrated in the figures, the individual magnets can be cylindrical and therefore have a circular cross section.

It is then possible to cut out each individual magnet by at least two complementary cutouts which have material-filled gaps at different height levels.

It is also possible to provide cutouts for at least two individual magnets close to one another, partial or not, that have material-filled gaps at different height levels for each of the two individual magnets. It is also possible to combine these two described configurations.

A cylindrical individual magnet is then surrounded by four cylindrical individual magnets having a cross section of the individual magnet cutout tangential at four different points respectively with a cross section of each of the adjacent individual magnet cutouts.

In this arrangement, there remain between the cutouts of the individual magnets areas of the magnet structure that can be preserved as individual magnets because they are isolated from the other individual magnets by the cutouts, although these areas do not have a circular cross section. Alternatively, these areas can be removed from the magnet structure.

The invention further relates to a linear or rotary electromagnetic motor or generator comprising a single magnet structure 2 or a plurality of magnet structures 2, as described above.

The magnet structure or structures 2 form magnet poles in a rectangular assembly for a linear electromagnetic motor or as part of a rotor that rotates around its center for a rotary electromagnetic motor. In this latter configuration, the magnet structure or structures 2 are arranged concentrically to the rotor.

Figure 12:
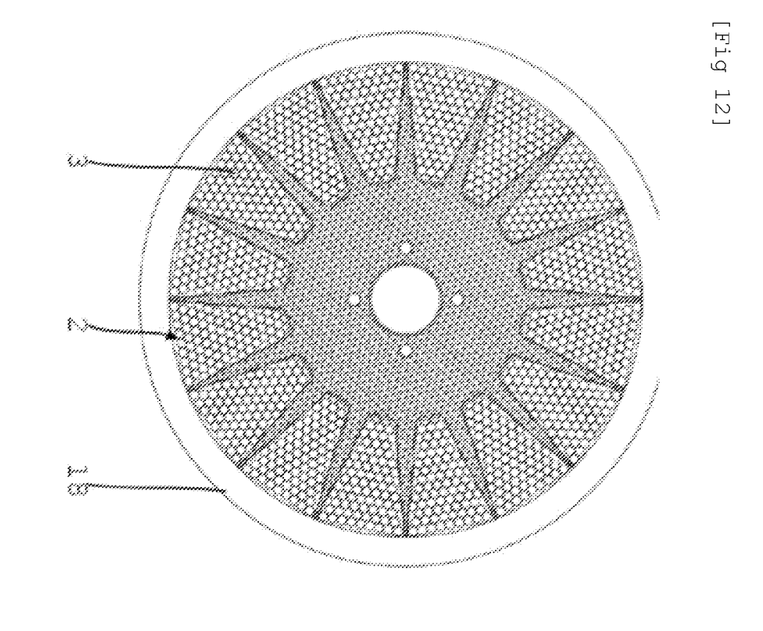
FIG. 12 shows a front view of a rotor that can be associated with a magnet structure as illustrated in FIGS. 1 to 11 to form an electromagnetic motor or generator according to the present invention.

FIG. 12 shows a rotor 18 of this type having a plurality of magnet structures 2. In an electromagnetic machine according to the present invention, the rotor 18 or each rotor 18 can comprise a plurality of magnet structures 2 as magnet poles, only one of which is identified in FIG. 12.

The rotor 18 or each rotor 17 can be made of composite to reduce iron losses. Each magnet pole which is in the form of a magnet structure 2 can be constituted by a plurality of individual magnets 3 connected to one another by composite, adhesive or resin.

Moreover, each magnetic pole 2 can be individually coated in a layer of composite to reinforce the solidity of the magnetic pole 2.

With regard to FIG. 12, the above description relates essentially to a rotary electromagnetic axial flux motor, although the present invention can be applied to any type of motor, in particular a radial flux motor or generator or mixed flux rotary or linear motor or generator.

With reference to all the figures, the invention finally relates to a fabrication method for a magnet structure 2 of the type described above.

The essential step in the method according to the invention is the realization in a blank magnet structure 2 of a plurality of groups of cutouts, the cutouts 4 to 7, 20, 21 of each group being interrupted, each forming two parts 4, 6; 5, 7; 20, 21 in the height direction of the cutout, and leaving a material-filled gap between the two parts 4, 6; 5, 7; 20, 21 of a given cutout.

The blank of the magnet structure 2 can have the same exterior shape as the magnet structure 2 to be produced.

The cutouts 4 to 7, 20, 21 are interrupted at different heights so that at least one material-filled gap between a cutout of one group is located at a height different from at least one material-filled gap and a cutout of another group, which leaves a non-flat heel 8a to 8d comprising one or more steps.

It is possible to make cutouts 4 to 7, 20, 21 using a plurality of processes, for example, including but not limited to electrical discharge machining or equivalent wire cutting or using a laser.

For complex shapes with more than four sides, it is possible to use a cutting bell for all the cutouts 4 to 7, 20, 21.

We claim:

1. A magnet structure (2) having three dimensions, one of which is height,
    the magnet structure (2) having cutouts (4 to 7, 20, 21) extending along the height of the magnet structure (2) and forming groups of cutouts, the cutouts (4 to 7, 20, 21) of each group being interrupted, forming two parts each (4, 6, 5, 7, 20, 21) and leaving a material-filled gap between the two parts (4, 6, 5, 7, 20, 21) of a given cutout, the material-filled gaps of one group of cutouts (4 to 7, 20, 21) forming a portion of a one-piece heel (8a to 8d) common to all the groups of cutouts, the cutouts (4 to 7, 20, 21) delimiting between them individual magnets (3) held connected to one another by the heel (8a to 8d), characterized in that the material-filled gaps have a height between 2 and 20% of a total height of the cutouts 4 to 7, 20, 21, at least one material-filled gap between one cutout (4, 6) of one group being located at a height different from at least one material-filled gap between a cutout (5, 7) of another group, so that the heel portions (8a to 8d) of the different groups of cutouts extend at least partly over different height levels in the magnet structure (2).

2. A magnet structure (2) according to claim 1, in which the cutouts (4 to 7) run all the way through the magnet structure (2), extending from one side of the magnet structure (2) to another side opposite it, one group of cutouts (4, 6) associated with one side intersecting with at least one group of cutouts (5, 7) associated with another side or one group of cutouts (20, 21) being extended by at least one other group of cutouts around the individual magnets (3).

3. A magnet structure (2) according to claim 2, in which the cutouts (4, 6, 5, 7, 20, 21) of a given group of cutouts extend parallel to one another.

4. A magnet structure (2) according to claim 1, in which the material-filled gaps can have the same dimension measured in the height of the magnet structure (2) for all the groups of cutouts.

5. A magnet structure (2) according to claim 1, in which the cutouts (4, 6, 5, 7, 20, 21) of a given group of cutouts have their material-filled gaps on at least two different height levels.

6. A magnet structure (2) according to claim 1, in which, in the vertically held position of the height of the magnet structure (2), said at least one material-filled gap between the cutout of one group has its highest end at a height equal to the height of a lowest end of said at least one material-filled gap between the cutout of another group.

7. A magnet structure (2) according to claim 1, in which the heel portions (8a to 8d) of the groups of cutouts extend at least partly over a number of height levels less than or equal to the number of sides of an individual magnet (3).

8. A magnet structure (2) according to claim 1, in which each individual magnet (3) is given an auxiliary cutout (17) extending along the height of the magnet structure (2) and separating the individual magnet (3) into two equal portions, the auxiliary cutouts (17) of the individual magnets (3) also being interrupted, each forming two parts in the height direction of the magnet structure (2), and leaving a material-filled gap between the two parts of a given auxiliary cutout (17).

9. A magnet structure (2) according to claim 1, in which the material-filled gaps are located in an area that surrounds the magnet structure (2) at half its height by more or less 20%.

10. A magnet structure (2) according to claim 1, in which the cutouts (4 to 7, 20, 21) are filled with a layer of nonconductive composite coating the individual magnets.

11. A magnet structure (2) according to claim 10, in which a ratio of a cross section of an individual magnet (3) to a cross section of the magnet structure (2) is less than 20%, a perimeter of each individual magnet (3) being less than the height of the individual magnet.

12. A linear or rotary electromagnetic motor or generator comprising:
    a magnet structure (2) having three dimensions, one of which is height,
    the magnet structure (2) having cutouts (4 to 7, 20, 21) extending along the height of the magnet structure (2) and forming groups of cutouts, the cutouts (4 to 7, 20, 21) of each group being interrupted, forming two parts each (4, 6, 5, 7, 20, 21) and leaving a material-filled gap between the two parts (4, 6, 5, 7, 20, 21) of a given cutout, the material-filled gaps of one group of cutouts (4 to 7, 20, 21) forming a portion of a one-piece heel (8a to 8d) common to all the groups of cutouts, the cutouts (4 to 7, 20, 21) delimiting between them individual magnets (3) held connected to one another by the heel (8a to 8d), characterized in that the material-filled gaps have a height between 2 and 20% of a total height of the cutouts 4 to 7, 20, 21, at least one material-filled gap between one cutout (4, 6) of one group being located at a height different from at least one material-filled gap between a cutout (5, 7) of another group, so that the heel portions (8a to 8d) of the different groups of cutouts extend at least partly over different height levels in the magnet structure (2); wherein
    the magnet structure (2) forms part of a rotor (18) that rotates around its center, the magnet structure (2) being arranged concentrically to the rotor (18).

13. A motor or generator according to claim 12, in which the magnet structure (2) is coated with a layer of composite.

14. A fabrication method for a magnet structure (2) according to claim 1, characterized by the following steps:
    insertion into a blank magnet structure (2) of a plurality of groups of cutouts, the cutouts (4 to 7, 20, 21) of each group being interrupted, each forming two parts (4, 6, 5, 7, 20, 21) in the height direction of the cutout, and leaving a material-filled gap between the two parts (4, 6, 5, 7, 20, 21) of a given cutout, the material-filled gap having a height between 2 and 20% of a total height of the cutouts,
    at least one material-filled gap between a cutout of one group being located at a different height from at least one material-filled gap between a cutout of another group.

15. A linear or rotary electromagnetic motor or generator comprising:
    a plurality of magnet structures (2) having three dimensions, one of which is height,
    each of the magnet structures (2) having cutouts (4 to 7, 20, 21) extending along the height of the magnet structure (2) and forming groups of cutouts, the cutouts (4 to 7, 20, 21) of each group being interrupted, forming two parts each (4, 6, 5, 7, 20, 21) and leaving a material-filled gap between the two parts (4, 6, 5, 7, 20, 21) of a given cutout, the material-filled gaps of one group of cutouts (4 to 7, 20, 21) forming a portion of a one-piece heel (8a to 8d) common to all the groups of cutouts, the cutouts (4 to 7, 20, 21) delimiting between them individual magnets (3) held connected to one another by the heel (8a to 8d), characterized in that the material-filled gaps have a height between 2 and 20% of a total height of the cutouts 4 to 7, 20, 21, at least one material-filled gap between one cutout (4, 6) of one group being located at a height different from at least one material-filled gap between a cutout (5, 7) of another group, so that the heel portions (8a to 8d) of the different groups of cutouts extend at least partly over different height levels in the magnet structure (2); wherein the plurality of magnet structures (2) forming part of a rotor (18) that rotates around its center, the plurality of magnet structures (2) being arranged concentrically to the rotor (18).

16. A motor or generator according to claim 12, in which each of the magnet structures (2) of the plurality of magnet structures is individually coated with a layer of composite.

* * * * *